United States Patent Office 3,445,526
Patented May 20, 1969

3,445,526
PRODUCTION OF PHENOLS
George Wallace Hooper, Norton-on-Tees, England, assignor to Imperial Chemical Industries Limited, London, England, a corporation of Great Britain
No Drawing. Continuation-in-part of application Ser. No. 523,024, Jan. 26, 1966. This application May 25, 1966, Ser. No. 552,727
Claims priority, application Great Britain, June 10, 1965, 24,603/65
Int. Cl. C07c 39/12, 39/24
U.S. Cl. 260—621                                10 Claims

ABSTRACT OF THE DISCLOSURE

There is provided a process for the production of phenols in which benzene or substituted benzene is brought into contact with oxygen in the presence of hydrogen, a solid catalyst of at least one metal from Groups I-B or VIII of the Periodic Table and in a reaction medium comprising liquid water and titanous ions. The titanous ions in the reaction medium is within the range of $2 \times 10^{-4}$ molar to $1.5 \times 10^{-3}$ molar. The substituents on the substituted benzene must be substantially nonoxidizable under the reaction conditions.

---

This is a continuation-in-part of my copending United States application Ser. No. 523,024, which is in turn a continuation-in-part of United States application Ser. No. 288,455.

This invention relates to a process for the production of phenols.

According to the invention there is provided a process for the production of phenols in which benzene or a substituted benzene is brought into contact with oxygen in the presence of hydrogen, a solid catalyst comprising at least one metal from Groups I-B or VIII of the Periodic Table, and a reaction medium comprising liquid water and titanous ions.

The process of the invention is particularly suitable for the production of phenols which have one more hydroxy group than the starting material. Thus the process is particularly advantageous in the production of phenol from benzene in that a good yield of phenol is obtained with only a relatively small quantity of polyhydroxylated benzene.

While the process of the invention is particularly applicable to the production of phenol from benzene it may also be applied to the production of substituted phenols from substituted benzenes particularly monosubstituted benzenes. The substituent or substituents in the substituted benzene should not be oxidised to any substantial extent under the conditions of the process. Examples of suitable substituents are carboxylic acid, ester, amide, carbonyl, alkyl, acylamido and hydroxy groups and difficultly replaceable halogen atoms. It is preferred that the substituted benzene is at least as soluble in water as benzene.

The titanous ions are preferably provided by adding a titanous compound for example, a titanous salt to the reaction mixture. A very suitable titanous salt is titanous sulphate. However, the titanous ions may be provided by adding a titanic compound which is reducible in situ by hydrogen.

It is preferred that the concentration of titanous ions in the reaction medium is at least $2 \times 10^{-4}$ molar and does not exceed $1.5 \times 10^{-3}$ molar and more preferably, is about $5 \times 10^{-4}$ molar. Higher concentrations of titanous ions may lead to reduced yields of the desired phenol and therefore while such higher concentrations may be used they are usually not desirable.

The solid catalyst comprises at least one metal from Groups I-B or VIII of the Periodic Table, for example gold, platinum and palladium. It is preferred that the metal is palladium, which may be alloyed or mixed with a minor proportion of one or more other metals, particularly gold or platinum. The metal may be used in colloidal form but preferably it is supported on a carrier, the metal preferably forming 1 to 10% of the total weight of the catalyst. The carrier may be for example a refractory oxide such as alumina, silica, silica-alumina, titanium dioxide, zirconium dioxide or beryllium oxide or it may be graphite or silicon carbide. It is preferred that the carrier is silica-alumina or silica gel having a specific surface area within the range 200 to 400 m.²/g. The catalyst may be produced by impregnating a carrier with a solution prepared by dissolving a metal compound for example, palladium chloride, in the minimum amount of an acid such as dilute hydrochloric acid, drying and reducing the compound to metal by hydrogen at for example, 50° to 400° C.

The process is carried out in the presence of a reaction medium comprising liquid water. While it is preferred that the reaction medium is water alone, it may contain up to 10% by volume of another liquid which is not a lower aliphatic carboxylic acid such as acetic acid or a substance which oxidises to a lower aliphatic carboxylic acid under the conditions of the process of the invention. The other liquid may be an aliphatic alcohol for example, methanol.

The reaction medium preferably contains at least one acid which is a mineral acid for example, sulphuric acid, nitric acid, phosphoric acid, hydrochloric acid, or a sulphonic acid. The acid is preferably at least as strong as acetic acid. The concentration in the reaction medium is preferably within the range 0.01 N to 2 N. A suitable mixture of acids is one containing sulphuric and hydrochloric acids.

While it is usually preferred to carry out the process under substantially atmospheric pressure superatmospheric pressure may be used and may enable a lower amount of titanous ion to be used. The ratio of the partial pressure of oxygen to that of hydrogen is preferably within the range 0.5:1 to 1:1.

The oxygen may be supplied as pure oxygen or as oxygen diluted with a gas which is inert under the conditions of the process. It may be desirable to use diluted oxygen for reasons of safety but with adequate precautions, dilution is not necessary. The oxygen may be supplied as air.

The temperature at which the process is operated is conveniently in the range 0 to 30° C.

EXAMPLE 1

A series of experiments was carried out in which a mixture of hydrogen (3 litres per hour), oxygen (2.5 litres per hour) and argon (5 litres per hour) was passed at atmospheric pressure for 2 hours into 110 mls. of a well-stirred ice-cold reaction mixture consisting of sulphuric acid ($10^{-1}$ N), hydrochloric acid ($10^{-2}$ N), titanous sulphate, 2 g. of a finely divided palladium on silica gel catalyst containing 5% palladium and 10 ml. benzene. The weights of titanous sulphate used and of phenol formed are given in the following table:

| Expt. No. | Titanous sulphate, mg. | Phenol, mg. |
|---|---|---|
| 1 | 3 | 197 |
| 2 | 6 | 201 |
| 3 | 8 | 203 |
| 4 | 38.5 | 174 |
| 5 | 50.3 | 150 |

Substantially no hydroquinone was formed in any of these experiments.

EXAMPLE 2

Comparative experiments to demonstrate the advantage of using titanous ions over ferrous ions were carried out under the conditions described in Example 1 except that either 0.1 g. titanous sulphate or 0.05 g. ferrous sulphate heptahydrate was used. While the titanous sulphate experiment yielded 130 mg. phenol and only 3.5 mg. hydroquinone the ferrous sulphate experiment yielded 130 mg. quinol as well as 165 mg. phenol.

I claim:

1. A process for the production phenol or a monoalkylated benzene at least as soluble in water as benzene is brought into contact at temperatures between 0° and 30° C. with oxygen in the presence of hydrogen, a solid catalyst comprising at least one metal from Groups I-B or VIII of the Periodic Table and a reaction medium consisting essentially of liquid water and titanium salts and at least one acid at least as strong as acetic acid and selected from the group consisting of mineral acids and sulphonic acids in a concentration of 0 to 2 N, said medium providing titanous ions within the range $2 \times 10^{-4}$ molar to $1.5 \times 10^{-3}$ molar and wherein the ratio of partial pressure of oxygen to hydrogen is within the range of 0.5:1 to 1:1.

2. A process as claimed in claim 1 in which the titanous ions are provided by titanous sulphate.

3. A process as claimed in claim 1 in which the concentration of titanous ions in the reaction medium is about $5 \times 10^{-4}$ molar.

4. A process as claimed in claim 1 in which the catalyst is supported on a carrier.

5. A process as claimed in claim 4 in which the carrier is a refractory oxide, graphite or silicon carbide.

6. A process as claimed in claim 4 in which the carrier is silica-alumina or silica gel having a specific surface area within the range 200 to 400 m.$^2$/g.

7. A process as claimed in claim 4 in which the Group I-B or VIII metal forms 1 to 10% by weight of the total weight of the catalyst.

8. A process as claimed in claim 1 in which the catalyst comprises palladium.

9. A process as claimed in claim 1 in which the acid concentration in the reaction medium is within the range 0.01 Normal to 2 Normal.

10. A process as claimed in claim 1 wherein benzene is reacted to form phenol.

References Cited

UNITED STATES PATENTS 3,033,903 5/1962 Loch _____ 260—6216
3,361,533 1/1968 Hooper _____ 23—207

FOREIGN PATENTS 1,366,253 6/1964 France.

LEON ZITVER, *Primary Examiner.*

R. ROBERTS, *Assistant Examiner.*

U.S. Cl. X.R.

260—623, 624

PO-1050
(5/69)

UNITED STATES PATENT OFFICE
CERTIFICATE OF CORRECTION

Patent No. 3,445,526           Dated May 20, 1969

Inventor(s) George Wallace Hooper

It is certified that error appears in the above-identified patent and that said Letters Patent are hereby corrected as shown below:

In Claim 1, line 1, after "production" insert --of phenols in which benzene or --.

SIGNED AND
SEALED

AUG 26 1969

(SEAL)
Attest:

Edward M. Fletcher, Jr.
Attesting Officer

WILLIAM E. SCHUYLER, JR.
Commissioner of Patents